(12) United States Patent
Kim et al.

(10) Patent No.: US 11,959,193 B2
(45) Date of Patent: Apr. 16, 2024

(54) METHOD OF MANUFACTURING AN ARAMID AND CARBON-NANOTUBE COMPOSITE FIBER

(71) Applicant: KOREA INSTITUTE OF SCIENCE AND TECHNOLOGY, Seoul (KR)

(72) Inventors: Dae Yoon Kim, Jeollabuk-do (KR); Ki Hyun Ryu, Jeollabuk-do (KR); Bon Cheol Ku, Jeollabuk-do (KR); Jun Yeon Hwang, Jeollabuk-do (KR); Nam Dong Kim, Jeollabuk-do (KR); Dong Ju Lee, Jeollabuk-do (KR); Seo Gyun Kim, Jeollabuk-do (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 17/701,398

(22) Filed: Mar. 22, 2022

(65) Prior Publication Data

US 2023/0114595 A1 Apr. 13, 2023

(30) Foreign Application Priority Data

Oct. 12, 2021 (KR) .......... 10-2021-0134769

(51) Int. Cl.

| | | |
|---|---|---|
| D01D 5/12 | (2006.01) | |
| C08G 69/26 | (2006.01) | |
| C08K 3/04 | (2006.01) | |
| D01D 1/02 | (2006.01) | |
| D01D 5/06 | (2006.01) | |
| D01F 1/09 | (2006.01) | |
| D01F 1/10 | (2006.01) | |
| D01F 6/60 | (2006.01) | |
| D01F 9/12 | (2006.01) | |
| D02J 1/22 | (2006.01) | |
| C08J 5/00 | (2006.01) | |

(52) U.S. Cl.
CPC .............. *D01F 1/10* (2013.01); *C08G 69/26* (2013.01); *C08K 3/041* (2017.05); *D01D 1/02* (2013.01); *D01D 5/06* (2013.01); *D01F 6/605* (2013.01); *D01F 9/12* (2013.01); *C08G 2250/00* (2013.01); *C08J 5/005* (2013.01); *C08K 2201/011* (2013.01); *D10B 2331/02* (2013.01)

(58) Field of Classification Search
CPC ...... C08G 69/26; C08G 2250/00; C08J 5/005; C08K 3/041; C08K 2201/011; D01D 1/02; D01D 5/06; D01D 5/12; D01D 5/16; D01F 1/09; D01F 1/10; D01F 6/605; D02J 1/22; D10B 2331/02

USPC .............. 264/178 F, 184, 210.6, 210.8, 211, 264/331.19; 524/495, 606

See application file for complete search history.

(56) References Cited

U.S. PATENT DOCUMENTS

| | | | | |
|---|---|---|---|---|
| 5,512,368 | A * | 4/1996 | Harmer .................. | D01F 6/605 524/495 |
| 2012/0153233 | A1* | 6/2012 | Gibon ...................... | H01B 1/24 252/511 |
| 2013/0214210 | A1* | 8/2013 | Hondo ..................... | B05D 5/12 252/502 |
| 2014/0363669 | A1* | 12/2014 | Otto ......................... | D01D 5/12 264/210.8 X |
| 2015/0354094 | A1* | 12/2015 | Parker ...................... | D01D 5/06 428/221 |

FOREIGN PATENT DOCUMENTS

| | | | | |
|---|---|---|---|---|
| EP | 2333003 A1 * | 6/2011 | ............. | C08K 3/041 |
| JP | 2006307367 A | 11/2006 | | |
| JP | 2007-217669 A | 8/2007 | | |
| JP | 2008285789 A | 11/2008 | | |
| KR | 10-1108425 B1 | 1/2012 | | |
| KR | 10-1776437 B1 | 9/2017 | | |
| KR | 10-1875260 B1 | 7/2018 | | |
| KR | 20190040556 A | 4/2019 | | |
| WO | WO-2008140533 A2 * | 11/2008 | ............. | C08J 5/005 |
| WO | 2011/054008 A2 | 5/2011 | | |

OTHER PUBLICATIONS

Jian-Liang Gong et al., "Aramid-Assisted Acid Spinning of Continuous Multi-Walled Carbon Nanotube Fibers for Twisted, Robust, and Multifunctional Yarns", Macromolecular Material and Engineering, 2015, 300, 954-959.

Korean Office Action dated Mar. 22, 2023, in the counterpart Korean Patent Application No. 10-2021-0134769.

Korean Decision to Grant dated Sep. 26, 2023, in the counterpart Korean Patent Application No. 10-2021-0134769.

\* cited by examiner

*Primary Examiner* — Leo B Tentoni

(74) *Attorney, Agent, or Firm* — Rabin & Berdo, P.C.

(57) ABSTRACT

Disclosed are a spinning dope for an aramid and carbon-nanotube composite fiber and a method of manufacturing an aramid and carbon-nanotube composite fiber using the same.

6 Claims, 10 Drawing Sheets

Example 1
11 parts by weight

Example 2
25 parts by weight

Example 3
42 parts by weight

Example 4
66 parts by weight

Example 5
100 parts by weight

Example 6
150 parts by weight

Example 7
233 parts by weight

Example 8
400 parts by weight

Example 9
900 parts by weight

Comparative Example 1　　Comparative Example 2
0.1 parts by weight　　　1 parts by weight Comparative Example 3　　Comparative Example 4
5 parts by weight　　　10 parts by weight

METHOD OF MANUFACTURING AN ARAMID AND CARBON-NANOTUBE COMPOSITE FIBER

CROSS-REFERENCE TO RELATED APPLICATION

This application claims under 35 U.S.C. § 119(a) the benefit of priority from Korean Patent Application No. 10-2021-0134769, filed on Oct. 12, 2021, the entire contents of which are incorporated herein by reference.

BACKGROUND

(a) Technical Field

The present disclosure relates to a spinning dope for an aramid and carbon-nanotube composite fiber and a method of manufacturing an aramid and carbon-nanotube composite fiber using the same.

(b) Background Art

Aramid, which is an abbreviation of aromatic amide, is a polymer compound in which at least 85% of aromatic compounds having a cyclic molecular structure are linked through an amide bond (—NHCO—) composed of nitrogen, hydrogen, carbon, and oxygen. Aramids include para-aramids, having a structure in which aromatic compounds are linearly linked through an amide bond, and meta-aramids, in which aromatic compounds are not linearly linked. Para-aramids exhibit superior properties such as high strength, high elasticity, low shrinkage, and the like, and are used for various applications in specialized industries such as the aerospace field, as well as for bulletproof applications due to the high strength thereof.

Carbon nanotubes (CNTs) are an allotrope of carbon, and have a cylindrical nanostructure. Carbon nanotubes have a variety of unique properties and are thus useful in various fields such as nanotechnology, electrical engineering, optics, and materials engineering. In particular, carbon nanotubes exhibit very specific thermal conductivity and mechanical and electrical properties, so they are applied as an additive for various structural materials.

Materials having superior properties, such as aramids, carbon nanotubes, etc., are manufactured in the form of fiber through spinning or the like in order to utilize the inherent properties thereof. Attempts have been made to improve rigidity, elasticity, conductivity and the like by mixing aramid and carbon nanotubes, but research thereon has been very limited due to the extremely low solubility and dispersibility of the individual materials.

SUMMARY OF THE DISCLOSURE

An object of the present invention is to provide a spinning dope capable of manufacturing an aramid and carbon-nanotube composite fiber through a single process, and a method of manufacturing the composite fiber using the same.

The objects of the present invention are not limited to the foregoing. The objects of the present invention will be able to be clearly understood through the following description and to be realized by the means described in the claims and combinations thereof.

An embodiment of the present invention provides a spinning dope for an aramid and carbon-nanotube composite fiber, including an aramid, carbon nanotubes, and a super strong acid, in which the spinning dope has a lyotropic liquid crystal phase.

The spinning dope may include 11 parts by weight to 900 parts by weight of the carbon nanotubes based on 100 parts by weight of the aramid.

The carbon nanotubes may have a purity of 80% or more.

The carbon nanotubes may have an IG/ID of 30 or more.

The super strong acid may include at least one selected from the group consisting of sulfuric acid, sulfurochloridic acid, perchloric acid, triflic acid, fluoroboric acid, fluoroantimonic acid, carborane acid, magic acid, and combinations thereof.

Another embodiment of the present invention provides a method of manufacturing an aramid and carbon-nanotube composite fiber, including preparing a spinning dope having a lyotropic liquid crystal phase by adding an aramid and carbon nanotubes to a super strong acid and manufacturing a composite fiber by spinning the spinning dope.

The spinning dope may have a concentration such that a total weight of the aramid and the carbon nanotubes is 0.05 mg to 500 mg per 1 mL of a solvent.

The composite fiber may be manufactured by spinning the spinning dope at to 150° C.

The composite fiber may have a stretching ratio of 0.1 to 50.

The composite fiber may have a diameter of 0.01 μm to 1,000 μm.

The composite fiber may have a polarization Raman ratio of 2 or more.

BRIEF DESCRIPTION OF THE DRAWINGS

The above and other features of the present invention will now be described in detail with reference to certain exemplary embodiments thereof illustrated in the accompanying drawings, which are given hereinbelow by way of illustration only, and thus are not limitative of the present invention, and wherein.

DETAILED DESCRIPTION

Figure 1A:
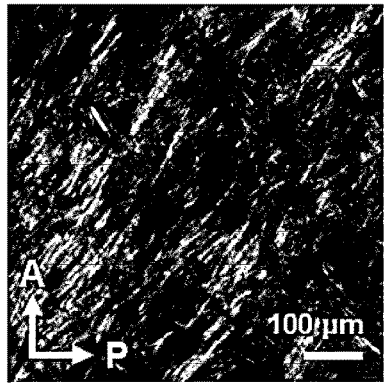
FIG. 1A shows the results of analysis of the spinning dopes according to Examples 1 to 9 using a polarization optical microscope.
Figure 1A:
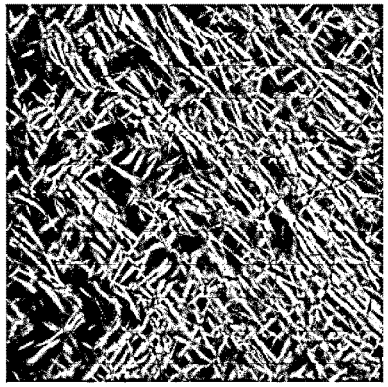
Figure 1A:
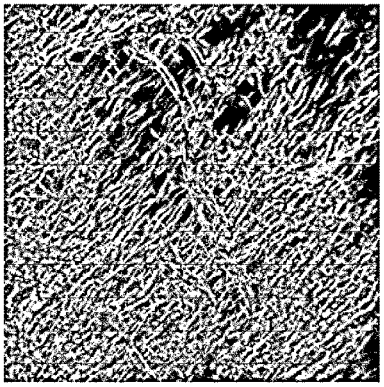
Figure 1A:
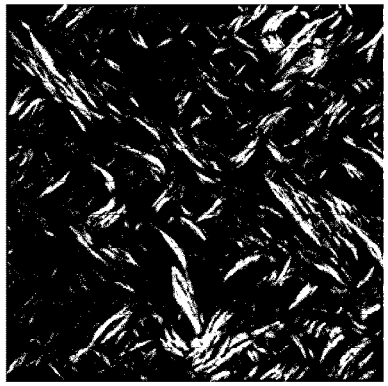
Figure 1A:
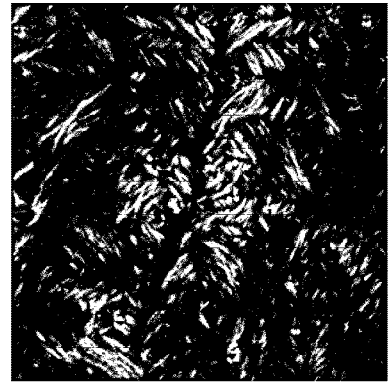
Figure 1A:
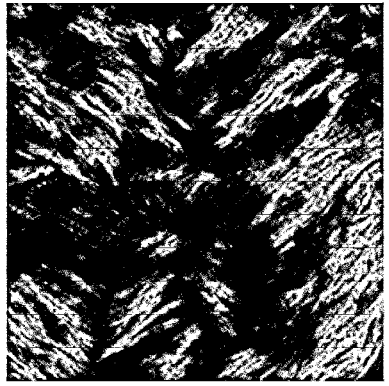
Figure 1A:
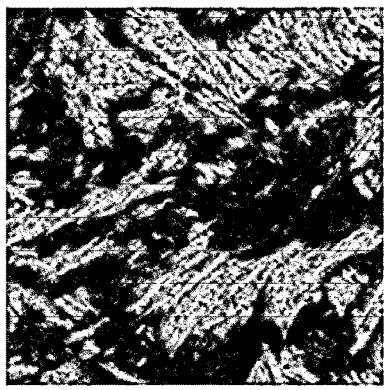
Figure 1A:
Figure 1A:
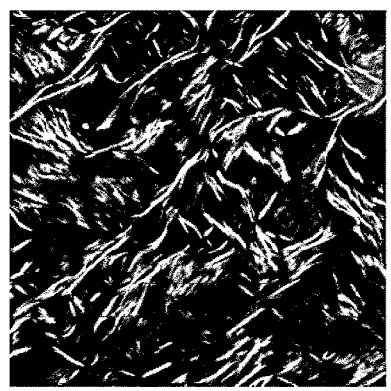

The above and other objects, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the disclosure and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it may be directly on the other element, or intervening elements may be present therebetween. Similarly, when an element such as a layer, film, area, or sheet is referred to as being "under" another element, it may be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

According to the present invention, a spinning dope for an aramid and carbon-nanotube composite fiber may include an aramid, carbon nanotubes, and a super strong acid.

The present invention is technically characterized in that the dispersibility of the aramid and the carbon nanotubes is improved using a super strong acid as a solvent for a spinning dope. The super strong acid may include at least one selected from the group consisting of sulfuric acid, sulfurochloridic acid, perchloric acid, triflic acid, fluoroboric acid, fluoroantimonic acid, carborane acid, magic acid, and combinations thereof.

Moreover, the spinning dope according to the present invention exhibits a lyotropic liquid crystal phase even in the super strong acid. Since the aramid and the carbon nanotubes in the spinning dope exist in a lyotropic liquid crystal phase having a certain orientation, the physical, chemical, and electrical properties of the composite fiber may be improved, and the composite fiber may be continuously manufactured through a single process. For example, a composite fiber having equivalent or improved properties may be obtained, without the need to provide a solenoid device that generates an electric field for the orientation of carbon nanotubes, and moreover without additional devices or additional steps for stretching or the like using a special device after spinning the composite fiber.

In order to exhibit the lyotropic liquid crystal phase, the spinning dope of the present invention includes 11 parts by weight to 900 parts by weight of the carbon nanotubes based on 100 parts by weight of the aramid. If the amount of the carbon nanotubes is less than 11 parts by weight, the lyotropic liquid crystal phase may not be exhibited.

The carbon nanotubes may have a purity of 80% or more, 90% or more, or 99% or more. If carbon nanotubes having a purity less than 80% are used, impurities such as amorphous carbon or metal catalysts may interfere with one-dimensional long-distance interactions between the aramid and the carbon nanotubes, so the lyotropic liquid crystal phase may not be exhibited.

The carbon nanotubes may have an IG/ID of 30 or more, 40 or more, 50 or more, 60 or more, 70 or more, 80 or more, or 90 or more. The crystallinity and defects of the carbon nanotubes may be determined through Raman spectroscopy. Here, a D-band related to defects and impurities appears in the vicinity of 1300 $cm^{-1}$, and a G-band related to the $sp^2$ carbon bond of the nanotubes appears in the vicinity of 1600 $cm^{-1}$. IG/ID means the relative intensity ratio of the above two peaks. In the case in which carbon nanotubes having an IG/ID less than 30 and thus low crystallinity are used, problems related to solubility may occur, so carbon nanotubes may severely agglomerate in the spinning dope.

As such, the one-dimensional long-distance interaction in the solvent may be formed only when simultaneously controlling the π bonding force between the carbon nanotubes and the aramid main chain and the repulsive force of ions formed on the surface between different materials, whereby the liquid crystal phase may be effectively exhibited. According to the present invention, the lyotropic liquid crystal phase obtained by adding aramid with carbon nanotubes having appropriate purity and crystallinity is capable of improving processability and thus has a good effect on improving the properties of the composite fiber.

The method of manufacturing the aramid and carbon-nanotube composite fiber according to the present invention may include preparing a spinning dope having a lyotropic liquid crystal phase by adding an aramid and carbon nanotubes to a super strong acid and manufacturing a composite fiber by spinning the spinning dope.

The configuration of the spinning dope is as described above, and a redundant description thereof is thus omitted below.

The concentration of the spinning dope is adjusted such that the total weight of aramid and carbon nanotubes is 0.05 mg to 500 mg per 1 mL of the solvent, followed by wet spinning to obtain a composite fiber.

The lyotropic liquid crystal phase of the spinning dope is maintained even in a coagulation bath. During wet spinning, when a spinning dope composed exclusively of carbon nanotubes is fed into a coagulation bath, the super strong acid solvent immediately spreads, and the carbon nanotubes rapidly agglomerate and cannot be stretched. In contrast, the spinning dope of the present invention, in which carbon nanotubes and aramid exist in the lyotropic liquid crystal phase, is capable of maintaining the lyotropic liquid crystal phase even in the coagulation bath, so the flexibility of the polymer main chain responds to stretching in the short-axis direction, and simultaneously, the π bonding force acts and thus carbon nanotubes also participate in the arrangement. Consequently, the composite fiber according to the present invention manifests superior specific strength and specific electrical conductivity.

The spinning conditions are not particularly limited, and for example, the spinning dope may be spun in a temperature range within which the solvent is not evaporated, such as 10° C. to 150° C., to obtain a composite fiber.

The stretching ratio of the composite fiber may be 0.1 to 50, or 5 to 20. The stretching of the composite fiber may be controlled by varying the winding speed.

The diameter of the composite fiber is not particularly limited. For example, the diameter thereof may be 0.01 μm to 1,000 μm, or 10 μm to 30 μm, and a composite fiber having an appropriate diameter may be manufactured depending on the use of the composite fiber, desired properties, etc. The diameter of the composite fiber may be adjusted through a needle or nozzle of a spinning device, a stretching ratio, and the like.

A better understanding of the present invention may be obtained through the following examples. These examples are merely set forth to illustrate the present invention, and are not to be construed as limiting the present invention.

Examples 1 to 9 and Comparative Examples 1 to 4

DuPont's KM was prepared as an aramid. The aramid was reprecipitated with acetone and stirred for 12 hours, thus removing residual impurities, followed by filtration and then vacuum drying at 25° C. for 12 hours.

Meijo's DX was prepared as carbon nanotubes.

Respective spinning dopes were prepared by adding the aramid and the carbon nanotubes to a super strong acid in the amounts shown in Table 1 below and performing stirring for about 24 hours.

TABLE 1

| Classification | Aramid [parts by weight] | Carbon nanotubes [parts by weight] |
| --- | --- | --- |
| Example 1 | 100 | 11 |
| Example 2 | 100 | 25 |
| Example 3 | 100 | 42 |
| Example 4 | 100 | 66 |
| Example 5 | 100 | 100 |
| Example 6 | 100 | 150 |
| Example 7 | 100 | 233 |
| Example 8 | 100 | 400 |

TABLE 1-continued

| Classification | Aramid [parts by weight] | Carbon nanotubes [parts by weight] |
| --- | --- | --- |
| Example 9 | 100 | 900 |
| Comparative Example 1 | 100 | 0.1 |
| Comparative Example 2 | 100 | 1 |
| Comparative Example 3 | 100 | 5 |
| Comparative Example 4 | 100 | 10 |

Each spinning dope was wet spun using a syringe pump and a needle. The spinning dope was wet spun at a stretching ratio of about 5 or more. Acetone and water were used in the coagulation bath and the washing bath, respectively, and water washing was performed for 6 hours to thereby remove as much solvent from the composite fiber as possible. Finally, in order to evaporate the remaining solvent, the composite fiber was dried in a vacuum oven at about 65° C. for 24 hours.

Test Example 1

Figure 1B:
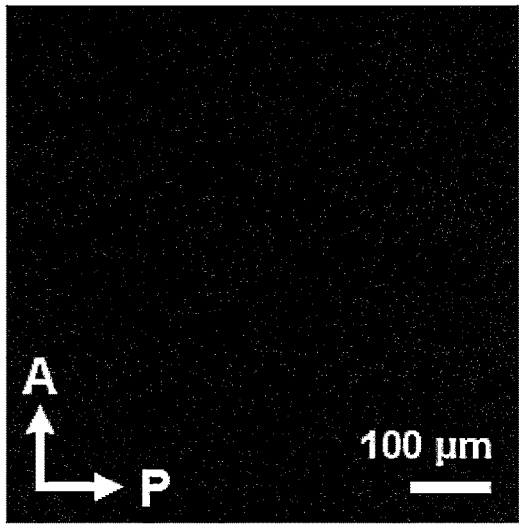
FIG. 1B shows the results of analysis of the spinning dopes according to Comparative Examples 1 to 4 using a polarization optical microscope.
Figure 1B:
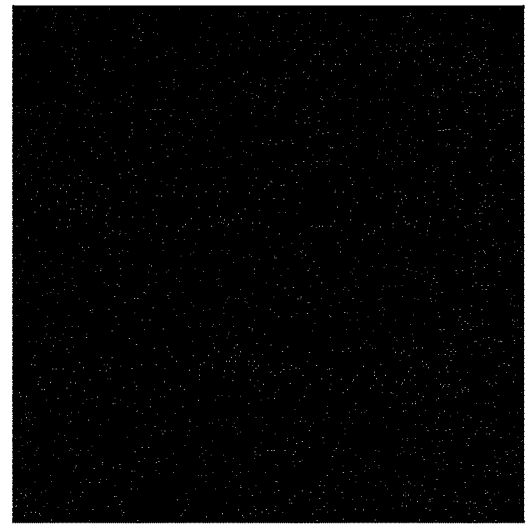
Figure 1B:
Figure 1B:

The spinning dopes according to Examples 1 to 9 and Comparative Examples 1 to 4 were analyzed using a polarization optical microscope. FIG. 1A shows the results of analysis of the spinning dopes according to Examples 1 to 9 using a polarization optical microscope. FIG. 1B shows the results of analysis of the spinning dopes according to Comparative Examples 1 to 4 using a polarization optical microscope.

With reference to FIGS. 1A and 1B, when the amount of carbon nanotubes is 11 parts by weight or more, the polarization microscope image shows bright birefringence because the lyotropic liquid crystal phase is exhibited.

Figure 2:
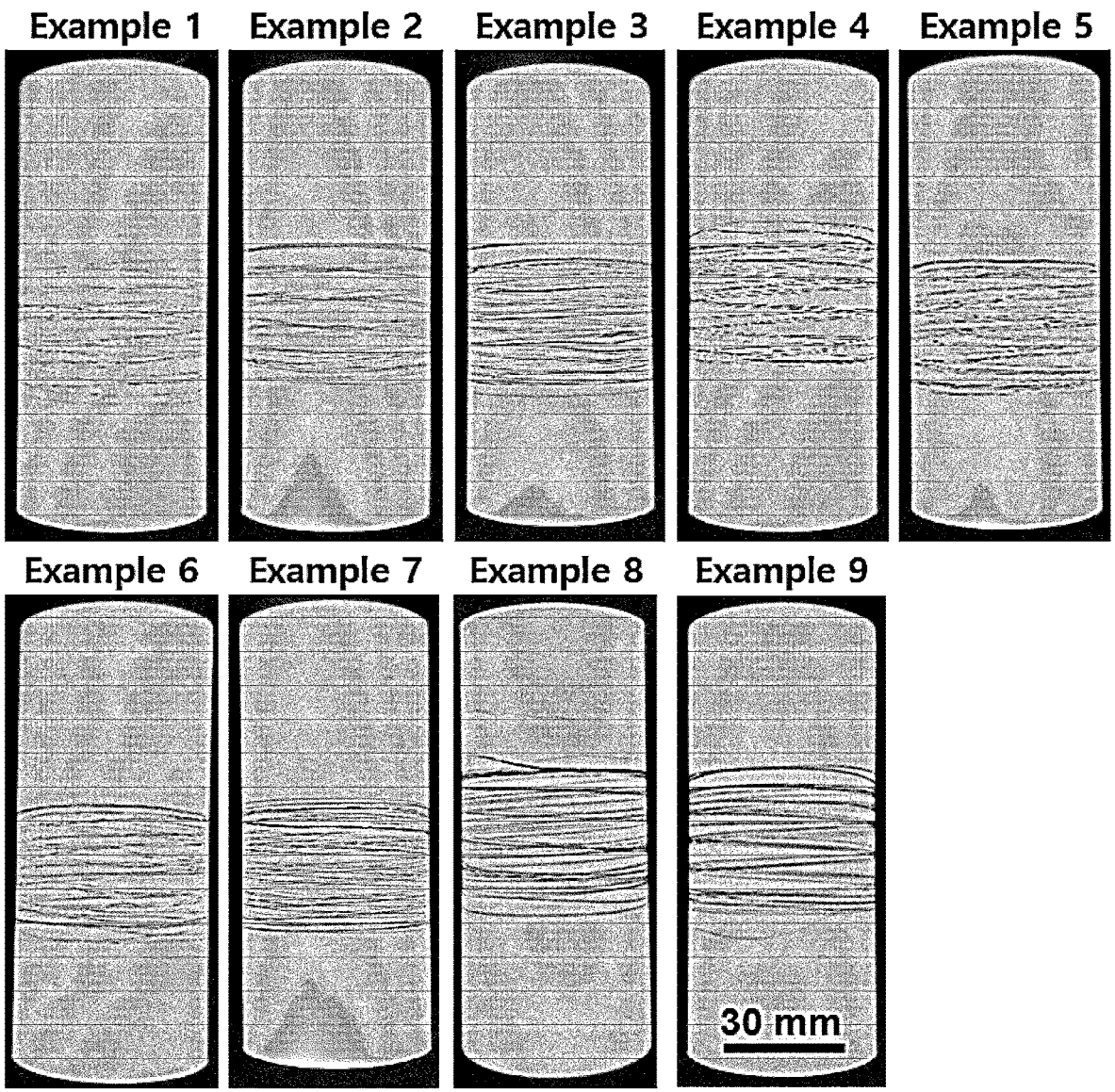
FIG. 2 shows images in which the composite fibers according to Examples 1 to 9 are wound on respective rolls.

FIG. 2 shows images in which the composite fibers according to Examples 1 to 9 are wound on respective rolls. Thereby, according to the present invention, it can be found that the composite fiber can be continuously produced.

Test Example 2

Figure 3:
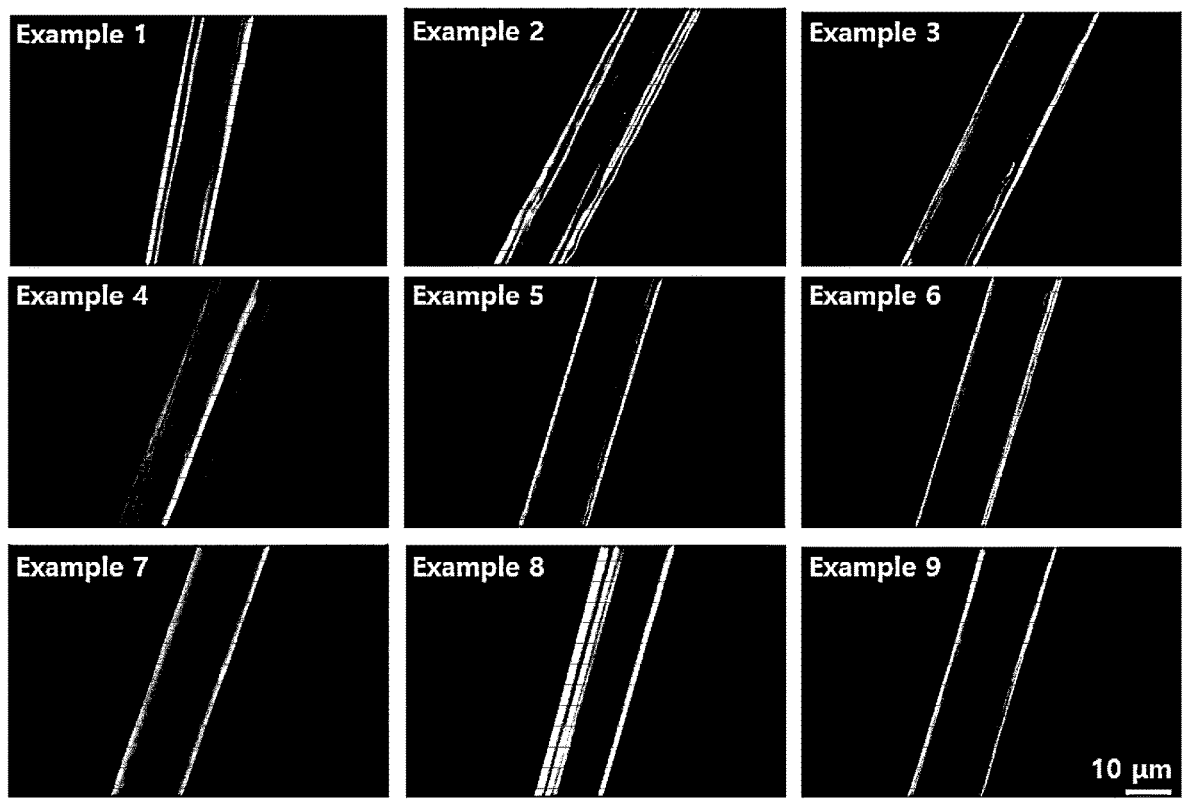
FIG. 3 shows the results of analysis of the composite fibers according to Examples 1 to 9 using a scanning electron microscope.

The composite fibers according to Examples 1 to 9 were analyzed using a scanning electron microscope. The results thereof are shown in FIG. 3. With reference thereto, the diameter of the composite fiber can be determined to be 10 μm to 30 μm.

Test Example 3

Figure 4A:
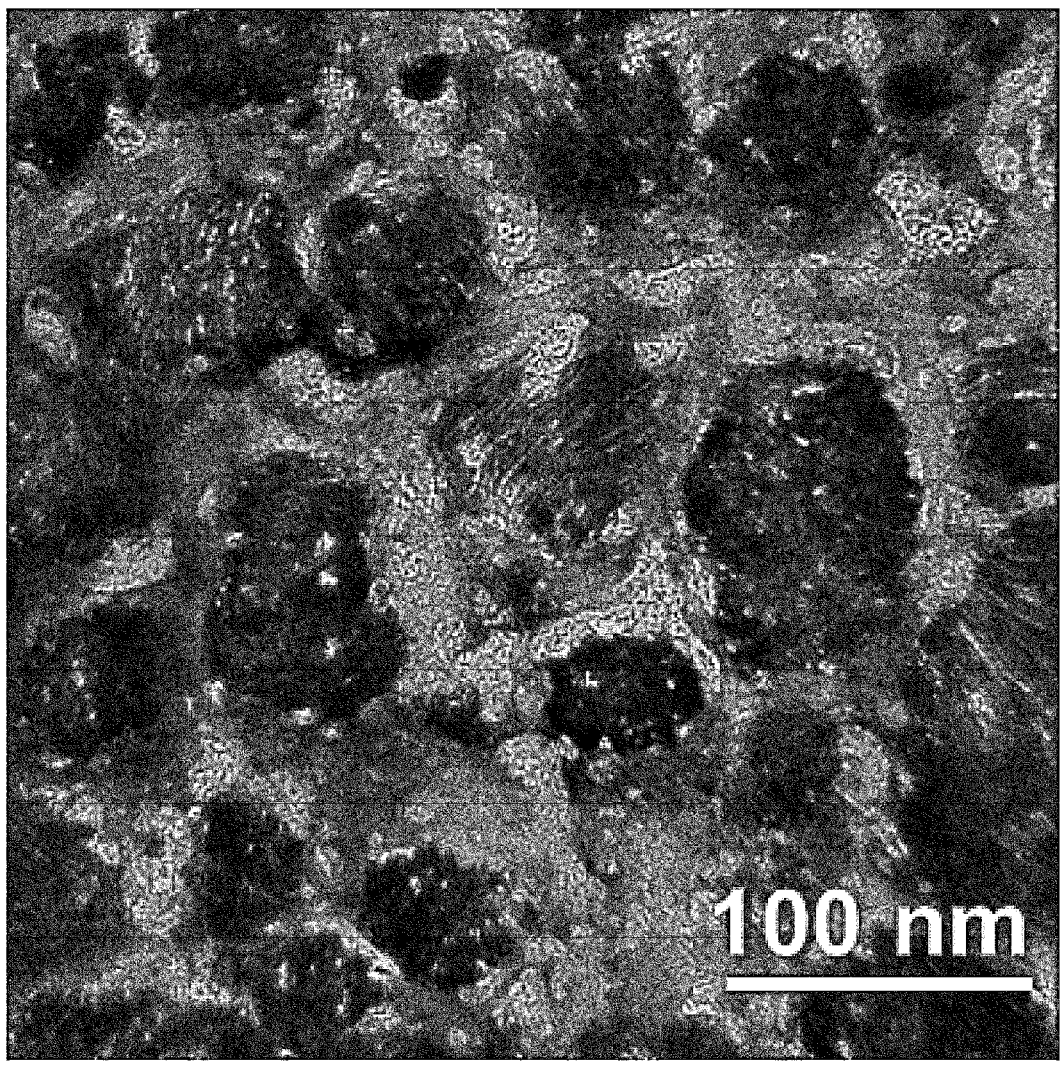
FIG. 4A shows the cross section of the composite fiber according to Example 5 cut in a direction perpendicular to the longitudinal direction thereof observed using a transmission electron microscope.
Figure 4B:
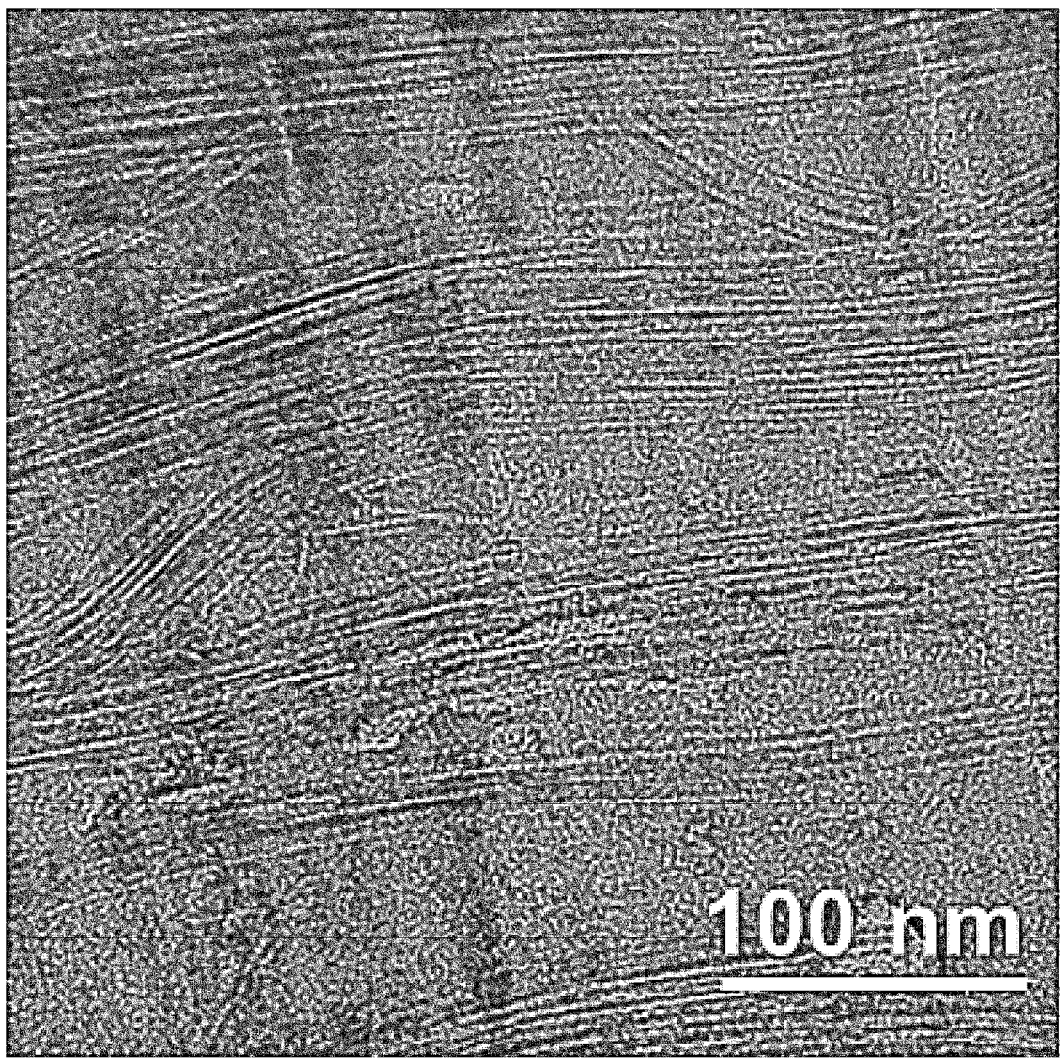
FIG. 4B shows the cross section of the composite fiber according to Example 5 cut in a direction parallel to the longitudinal direction thereof observed using a transmission electron microscope.

The composite fiber according to Example 5 was analyzed using a transmission electron microscope. FIG. 4A shows the cross section of the composite fiber cut in a direction perpendicular to the longitudinal direction thereof. FIG. 4B shows the cross section of the composite fiber cut parallel to the longitudinal direction thereof. With reference thereto, it can be seen that the composite fiber according to the present invention has a liquid-crystal hierarchical structure in which carbon nanotubes and aramid are arranged in the longitudinal direction of the composite fiber.

Test Example 4

Figure 5:
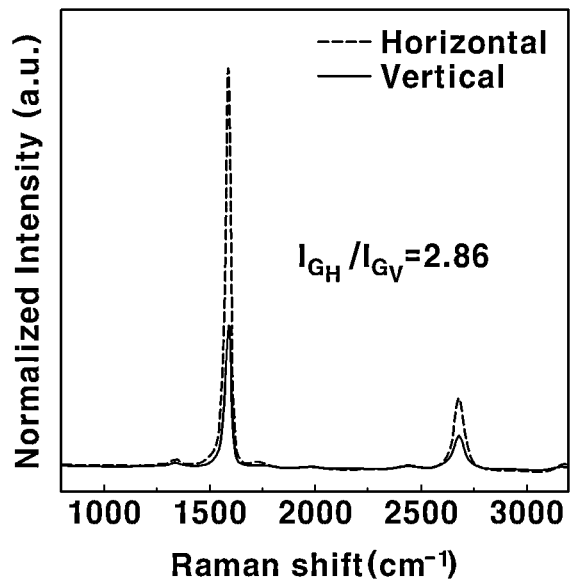
FIG. 5 shows the results of polarization Raman analysis on the composite fiber according to Example 5.

Polarization Raman analysis was performed on the composite fiber according to Example 5. The results thereof are shown in FIG. 5.

The polarization Raman ratio is a measure for evaluating the alignment of the carbon nanotubes constituting the composite fiber, and the alignment of the carbon nanotubes is proportional to the polarization Raman ratio.

The polarization Raman ratio may be represented as a maximum intensity ratio ($I_{GH}/I_{GV}$) of the G peak in the longitudinal direction of the composite fiber and the direction perpendicular thereto in the range of 1560 cm$^{-1}$ to 1600 cm$^{-1}$ upon polarization Raman analysis.

The composite fiber according to the present invention has a polarization Raman ratio of 2 or more, indicating that the carbon nanotubes are well arranged in the longitudinal direction of the composite fiber during the manufacture of the composite fiber.

Test Example 5

Figure 6:
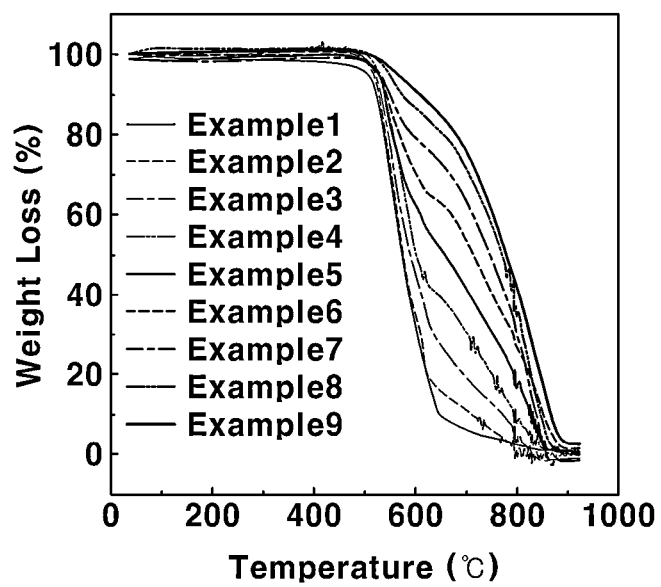
FIG. 6 shows the results of thermogravimetric analysis (TGA) on the composite fibers according to Examples 1 to 9.

Thermogravimetric analysis (TGA) was performed on the composite fibers according to Examples 1 to 9. The results thereof are shown in FIG. 6. With reference thereto, the thermal stability increases with an increase in the amount of the carbon nanotubes, indicating that the carbon nanotubes and the aramid are well mixed in the composite fiber.

Test Example 6

Figure 7A:
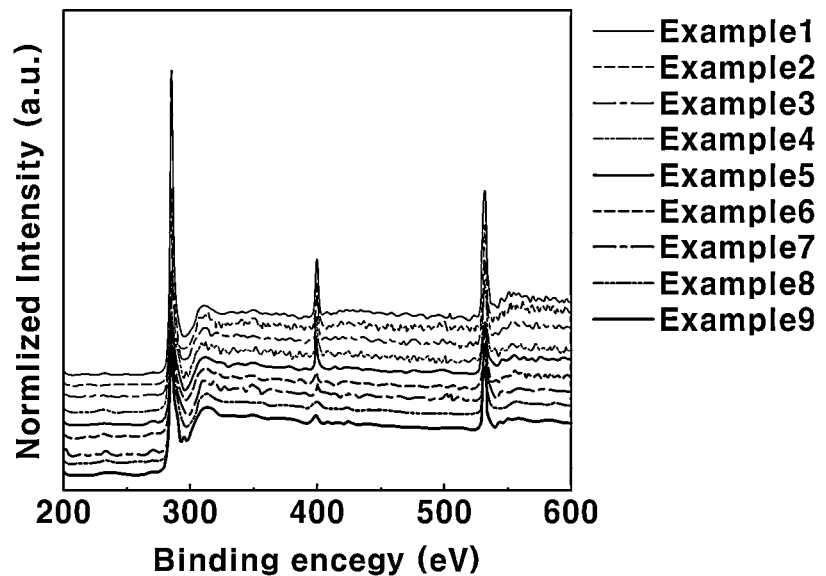
FIG. 7A shows the results of analysis of the composite fibers according to Examples 1 to 9 through X-ray photoelectron spectroscopy (XPS)

The composite fibers according to Examples 1 to 9 were analyzed through X-ray photoelectron spectroscopy (XPS). The results thereof are shown in FIG. 7A. In addition, the amounts of nitrogen and oxygen elements in respective composite fibers were measured based on the above results. The results thereof are shown in FIG. 7B.

Figure 7B:
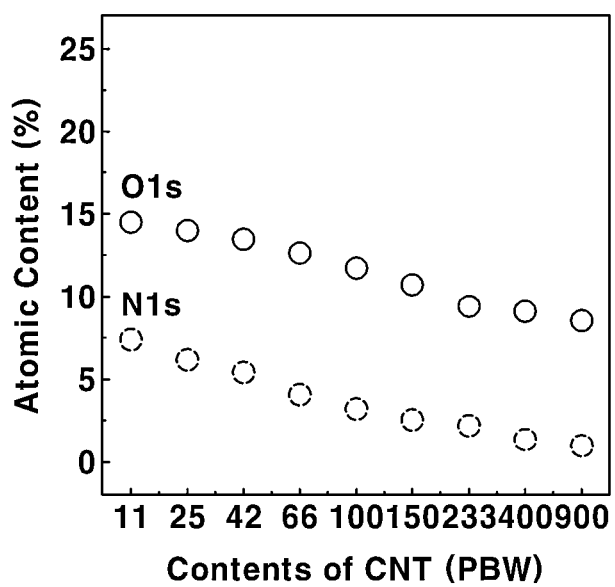
FIG. 7B shows the results of measurement of the amounts of nitrogen and oxygen elements in the composite fibers according to Examples 1 to 9.

With reference to FIGS. 7A and 7B, the peaks of O1S and N1S decrease with an increase in the amount of carbon nanotubes. This is deemed to be because the amount of the amide group of aramid decreases. Thereby, according to the present invention, it can be found that the carbon nanotubes and the aramid are well mixed.

Test Example 7

The mechanical properties of the composite fibers according to Examples 1 to 9 were measured.

Figure 8A:
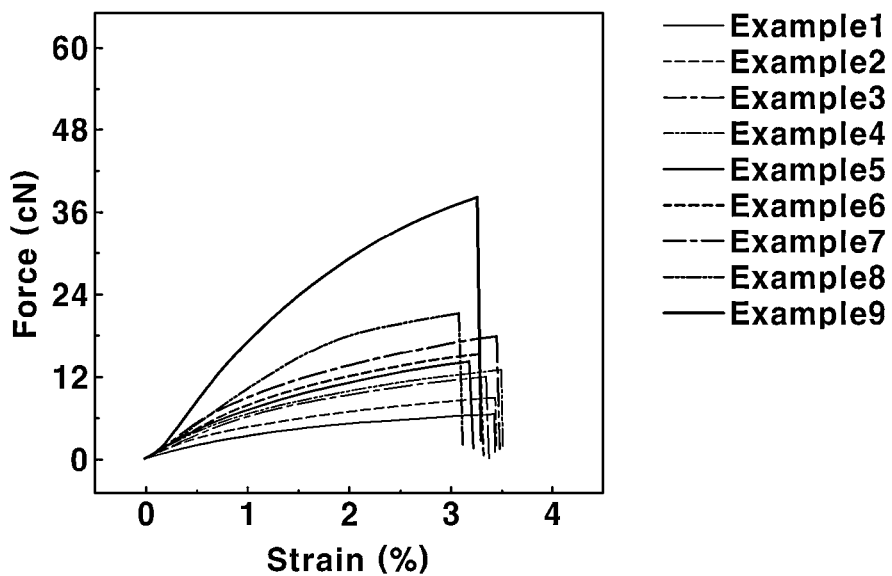
FIG. 8A shows the results of measurement of the specific strength of the composite fibers according to Examples 1 to 9.

FIG. 8A shows the results of measurement of the specific strength of each composite fiber. The specific strength was measured using a tester for measuring the properties of short fiber (FAVIMAT). The specific strength (N/tex) is determined by measuring the tensile strength (N) and the linear density (tex) using this tester.

Figure 8B:
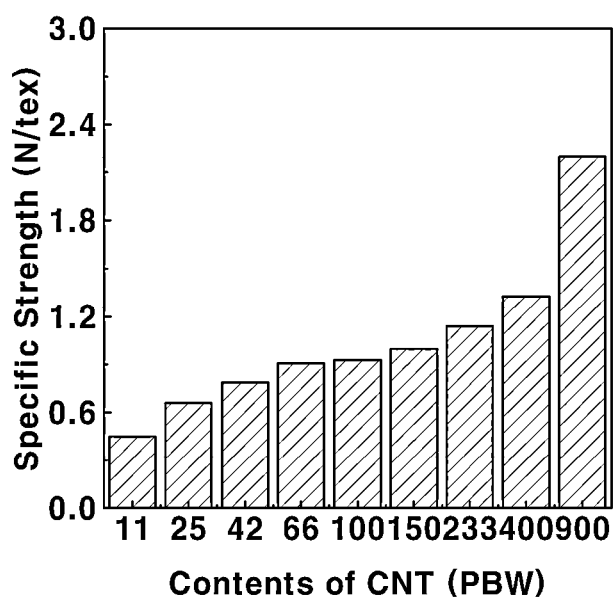
FIG. 8B shows the results of measurement of the specific modulus of the composite fibers according to Examples 1 to 9.

FIG. 8B shows the results of measurement of the specific modulus of each composite fiber. The specific modulus is an initial slope value in the graph of elongation and strength, and is indicated by defining a zone in which the strength is constantly increased depending on the elongation.

With reference to FIGS. 8A and 8B, it can be seen that the specific strength and specific modulus of the composite fiber are improved with an increase in the amount of carbon nanotubes. Therefore, according to the present invention, it is possible to obtain a composite fiber having improved mechanical properties such as specific strength, specific modulus, etc.

Test Example 8

Figure 9:
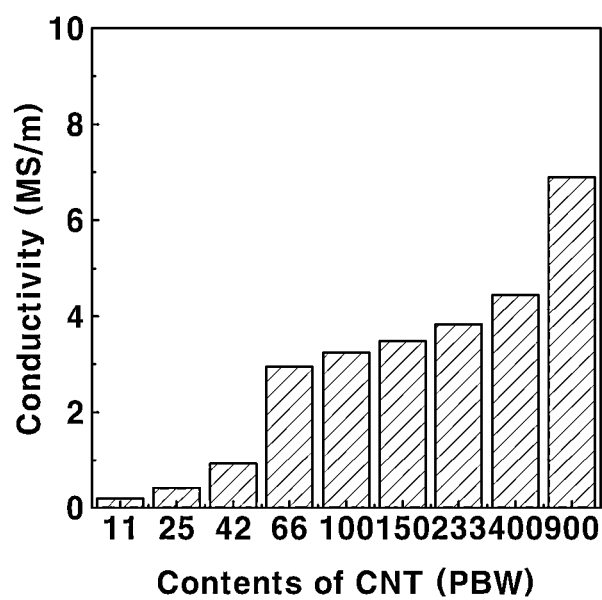
FIG. 9 shows the results of measurement of the electrical conductivity of the composite fibers according to Examples 1 to 9.

The electrical conductivity of the composite fibers according to Examples 1 to 9 was measured. The results thereof are shown in FIG. 9. With reference thereto, it can be seen that the electrical conductivity of the composite fiber is improved with an increase in the amount of carbon nanotubes.

As is apparent from the above description, according to the present invention, it is possible to manufacture an aramid and carbon-nanotube composite fiber through a single process without an additional step for controlling the orientation of the aramid and the carbon nanotubes.

According to the present invention, it is possible to manufacture an aramid and carbon-nanotube composite fiber having improved specific strength and specific electrical conductivity.

The effects of the present invention are not limited to the above-mentioned effects. It should be understood that the effects of the present invention include all effects that can be inferred from the description of the present invention.

Although the present invention has been described with reference to graphs, it is not limited to the described embodiments, and it will be obvious to those of ordinary skill in the art that various modifications and variations be made without departing from the spirit and scope of the present invention. Accordingly, examples of such modifications or variations will fall within the scope of the claims of the present invention. The scope of the present invention should be construed based on the appended claims.

What is claimed is:

1. A method of manufacturing an aramid and carbon-nanotube composite fiber, comprising:
    preparing a spinning dope having a lyotropic liquid crystal phase by adding both of an aramid and carbon nanotubes into a super strong acid, wherein the spinning dope only includes the aramid, the carbon nanotubes, and the super strong acid; and
    manufacturing a composite fiber by spinning the spinning dope, wherein the composite fiber is manufactured by spinning the spinning dope at 10° C. to 150° C.,
    wherein the step of adding both of the aramid and the carbon nanotubes into the super strong acid enables to simultaneously control a π bonding force between the carbon nanotubes and the aramid to have the lyotropic liquid crystal phase,
    wherein the carbon nanotubes have
        an amount of 11 parts by weight to 900 parts by weight based on 100 parts by weight of the aramid,
        a purity of 80% or more, and
        an IG/ID of 30 or more,
    wherein the amount, the purity, and the IG/ID of the carbon nanotubes and the π bonding force between the carbon nanotubes and the aramid control an orientation of the lyotropic liquid crystal phase.

2. The method of claim 1, wherein the super strong acid comprises at least one selected from the group consisting of sulfuric acid, sulfurochloridic acid, perchloric acid, triflic acid, fluoroboric acid, fluoroantimonic acid, carborane acid, magic acid, and combinations thereof.

3. The method of claim 1, wherein the spinning dope has a concentration such that a total weight of the aramid and the carbon nanotubes is 0.05 mg to 500 mg per 1 mL of a solvent.

4. The method of claim 1, wherein the composite fiber has a stretching ratio of 0.1 to 50.

5. The method of claim 1, wherein the composite fiber has a diameter of 0.01 µm to 1,000 µm.

6. The method of claim 1, wherein the composite fiber has a polarization Raman ratio of 2 or more.

* * * * *